(12) United States Patent
Liu et al.

(10) Patent No.: US 12,524,741 B2
(45) Date of Patent: Jan. 13, 2026

(54) CIGARETTE DEVICE MANAGEMENT SYSTEM AND METHOD

(71) Applicant: Zhangjiakou Cigarette Factory Co., Ltd., Zhangjiakou (CN)

(72) Inventors: Bo Liu, Zhangjiakou (CN); Aihua Zhang, Zhangjiakou (CN); Hengzhu Shi, Zhangjiakou (CN); Xiaotang Li, Zhangjiakou (CN); Weidong Yao, Zhangjiakou (CN); Guoping Wang, Zhangjiakou (CN); Zijuan Li, Zhangjiakou (CN); Chuan Yang, Zhangjiakou (CN); Junjie Pang, Zhangjiakou (CN); Peng Ji, Zhangjiakou (CN); Mingqi Nan, Zhangjiakou (CN); Zhanbo Jiang, Zhangjiakou (CN); Xiaohua Yang, Zhangjiakou (CN); Jia Tian, Zhangjiakou (CN); Dongfeng Li, Zhangjiakou (CN); Dong Yan, Zhangjiakou (CN)

(73) Assignee: Zhangjiakou Cigarette Factory Co., Ltd., Zhangjiakou (CN)

( * ) Notice: Subject to any disclaimer, the term of this patent is extended or adjusted under 35 U.S.C. 154(b) by 764 days.

(21) Appl. No.: 17/870,848

(22) Filed: Jul. 22, 2022

(65) Prior Publication Data

US 2023/0026103 A1    Jan. 26, 2023

(30) Foreign Application Priority Data

Jul. 23, 2021  (CN) .......................... 202110837189.X

(51) Int. Cl.
  *G06Q 10/20*    (2023.01)
  *G05B 23/02*    (2006.01)
  (Continued)

(52) U.S. Cl.
  CPC ......... *G06Q 10/20* (2013.01); *G05B 23/0254* (2013.01); *G06Q 10/0875* (2013.01); *G06Q 10/0631* (2013.01)

(58) Field of Classification Search
  CPC .............. G05B 23/0254; G06Q 10/20; G06Q 10/0875; G06Q 10/0631
  See application file for complete search history.

(56) References Cited

U.S. PATENT DOCUMENTS

| 2020/0012753 | A1* | 1/2020 | Yokoyama | .............. G06F 30/20 |
| 2020/0151654 | A1 | 5/2020 | Bradley | |

FOREIGN PATENT DOCUMENTS

| CN | 103559594 A | 2/2014 |
| CN | 109543881 A | 3/2019 |

(Continued)

OTHER PUBLICATIONS

Sze-jung Wu, etc., "A Neural Network Integrated Decision Support System for Condition-Based Optimal Predictive Maintenance Policy", published in IEEE Transactions on Systems, Man, and Cybernetics—Part A: Systems and Humans, vol. 37, No. 2, Mar. 2007, retrieved May 23, 2025. (Year: 2007).*

(Continued)

*Primary Examiner* — Shourjo Dasgupta
(74) *Attorney, Agent, or Firm* — Bayramoglu Law Offices LLC

(57) ABSTRACT

A cigarette device management system includes an information management module, and a maintenance prediction module, a device state acquisition module and a purchase statistics module which are in communication connection with it. The maintenance prediction module is built by an artificial neural network model and is configured to predict a failure interval. The device state acquisition module acquires a device operating parameter and an operating duration of the device in real time, and compares the device (Continued)

operating parameter with a safety parameter range. In accordance with the system, the maintenance timing of the device can be predicted, the purchase quantity of the spare part and the purchase timing of the spare part also can be predicted.

1 Claim, 2 Drawing Sheets

(51) Int. Cl.
*G06Q 10/0631* (2023.01)
*G06Q 10/0875* (2023.01)

(56) References Cited

FOREIGN PATENT DOCUMENTS

| | | | | | |
|---|---|---|---|---|---|
| CN | 110232399 | A | * | 9/2019 | |
| CN | 110555639 | A | | 12/2019 | |
| CN | 110929937 | A | * | 3/2020 | |
| CN | 111695744 | A | | 9/2020 | |
| CN | 112053009 | A | | 12/2020 | |
| DE | 102013205353 | A1 | * | 10/2014 | ............... A24C 5/00 |
| EP | 3876134 | A1 | | 9/2021 | |
| JP | 2012089162 | A | * | 5/2012 | |
| JP | 2018069810 | A | * | 5/2018 | |
| KR | 20191222074 | A | * | 10/2019 | |
| WO | WO-9616588 | A2 | * | 6/1996 | ......... A61K 49/0043 |

OTHER PUBLICATIONS

Xin Li, etc., "Predicting Remaining Useful Life of Industrial Equipment Based on Multivariable Monitoring Data Analysis", published in Chinese Automation Congress (CAC), pp. 1861-1866, conference from Nov. 30-Dec. 2, 2018, retrieved May 23, 2025. (Year: 2018).*

Cherry Bhargava, etc., "Review of Health Prognostics and Condition Monitoring of Electronic Components", published via IEEE Access on Apr. 21, 2020, retrieved May 23, 2025. (Year: 2020).*

Rui Wu, etc., "An Improved LSTM Neural Network with Uncertainty to Predict Remaining Useful Life", published in 2019 CAA Symposium on Fault Detection, Supervision and Safety for Technical Processes (SAFEPROCESS) Jul. 5-7, 2019, Xiamen, China, retrieved May 23, 2025. (Year: 2019).*

M.A. Herzong, etc., "Machine and Component Residual Life Estimation through the Application of Neural Networks", published to Arxiv on May 10, 2007, retrieved May 23, 2025. (Year: 2007).*

Oscar Serradilla, etc., "Deep learning models for predictive maintenance: a survey, comparison, challenges and prospect", published via Arxiv on Oct. 7, 2020, retrieved May 23, 2025. (Year: 2020).*

Mathias Kraus, etc., "Forecasting remaining useful life: Interpretable deep learning approach via variational Bayesian inferences", published to Decision Support Systems in 2019, retrieved May 23, 2025. (Year: 2019).*

Mukundan Srinivasan, etc., "A comprehensive clustering algorithm for strategic analysis of supply chain networks", published in Computers & Industrial Engineering 36, pp. 615-633, 1999, retrieved May 23, 2025. (Year: 1999).*

Qiwei Hu, etc., "Spare parts classification in industrial manufacturing using the dominance-based rough set approach", published via European Journal of Operational Research 262 (2017) 1136-1163, retrieved Oct. 22, 2025. (Year: 2017).*

E. Balugani, etc., "Clustering for inventory control systems", published via IFAC PapersOnLine 51-11 (2018) 1174-1179, retrieved Oct. 22, 2025. (Year: 2018).*

Irene Roda, etc., "A review of multi-criteria classification of spare parts", available online from 2014, retrieved Oct. 22, 2025. (Year: 2014).*

Anglou, F.Z., Ponis, S., & Spanos, A. (2021). A machine learning approach to enable bulk orders of critical spare-parts in the shipping industry. Journal of Industrial Engineering and Management, 14(3), 604-621, retrieved Oct. 22, 2025. (Year: 2021).*

* cited by examiner

CIGARETTE DEVICE MANAGEMENT SYSTEM AND METHOD

CROSS REFERENCE TO THE RELATED APPLICATIONS

This application is based upon and claims priority to Chinese Patent Application No. 202110837189. X, filed on Jul. 23, 2021, the entire contents of which are incorporated herein by reference.

TECHNICAL FIELD

The present invention relates to the field of a workshop device management system, and in particular to a cigarette device management system and method.

BACKGROUND

Generally, there are a large number of processing devices in workshops of various production enterprises. After a certain period of operation, some quick-wear parts or other parts of the device need to be replaced when reaching a certain degree of wear. For common parts, there will be spare parts in the warehouse. The spare parts can be rapidly obtained when maintenance and replacement are required.

In the field of cigarette production, device maintenance or spare part replacement generally occurs after the event, that is, maintenance and spare part replacement are carried out when production problems or failure that affects the operation of the device occurs. Some maintenance work and spare part replacement could be preventive work. The preventive work is generally carried out based on subjective determination by the operation experience of maintenance personnel, which is lack of objective data support and is prone to maintenance lag or advance. In a case of maintenance lag, device failure will occur, which will affect the normal operation of production. However, in a case of excessive advance of maintenance, the costs of maintenance and spare parts will be increased.

At present, most of spare parts are purchased by enterprises according to report by maintenance personnel. Generally, the planned purchase quantity will be more than the actual usage quantity, which is mainly used to prevent the shortage of spare parts in emergency repair. However, the method is not suitable for devices with low failure rate and long failure period. Furthermore, sometimes damage to spare parts may occur due to fission during storage, especially rubber products. Therefore, for workshops, a scientific system and method are urgently needed to predict the maintenance timing and help determine the purchase quantity and purchase timing of spare parts.

SUMMARY

The present application provides a cigarette device management system and method. The maintenance timing of the device can be predicted through the duration parameter of the spare part and the operating parameter of the device, the purchase quantity of spare parts can be determined through the previous device maintenance and spare part replacement records, and the purchase timing of the spare parts can be determined in combination with the purchase duration of the spare parts.

The technical solution used in the present invention to solve the technical problem thereof is as follows:

A cigarette device management system includes an information management module, and a maintenance prediction module, a device state acquisition module and a purchase statistics module which are in communication connection with the information management module. The information management module includes a spare part information archive, a spare part use archive, a device maintenance archive and a part/component replacement archive, which may be recorded manually or may be entered by a computer for automatic statistics.

Specifically, the spare part information archive includes: a spare part code, a spare part name, an applicable machine type, a manufacturer, recommended service duration of the spare part, time of purchase, and a warranty period. The spare part information archive may be coded on the spare part in advance to input spare part information, and when it is necessary to input the spare part information, the spare part information may be acquired by scanning the code.

The spare part use archive includes: the spare part code, a device using the spare part, a spare part replacement process, and a usage quantity for the spare part.

The device maintenance archive includes: maintenance time, failure reason analysis, a maintenance process, the name of the spare part for maintenance, the spare part code and a person in charge of maintenance.

The part/component replacement archive includes: replacement time, a replacement reason, a replacement process, the code of the spare part for the part/component, and a person in charge of replacement.

It is convenient to count the actual service duration and manufactures of various brands of spare parts from the information management module, and the quality of the spare parts from different manufacturers can be counted for screening.

Further, the maintenance prediction module is built by an artificial neural network model, and the module is configured to predict the failure interval of the device.

Specifically, the maintenance prediction module has three input values, one output value and two neurons, where the three input values are respectively the operating service duration of the spare part, the recommended service duration of the spare part, and the operating duration of the device; and the output value is the failure interval.

Specifically, the operating service duration of the spare part is the time duration between the current time and the replacement time of the spare part.

Further, the device state acquisition module is configured to acquire in real time a device operating parameter and an operating duration of the device and compare the device operating parameter with the safety range of the operating parameter. When the device operating parameter is within the safety parameter range, the device operates stably, and the maintenance timing is determined according to the failure interval predicted by the maintenance prediction module and the previous failure time point, namely, a sum of the spare part replacement time and the failure interval. The time when the device operating parameter is out of the safety parameter range is the maintenance timing.

Preferably, the device state acquisition module is configured to perform real-time acquisition by a data acquisition card and include a communication interface, a sensor and an information acquisition system. Specifically, the device state acquisition module connects a related I/O point or other interfaces of a production device to the corresponding sensor to acquire corresponding processing information, including various parameters of device operation.

Optionally, the device state acquisition module may also acquire device information by an Ethernet mode or other ways.

Further, the purchase statistics module counts according to the replacement time of the part/component replacement archive to obtain the operating service duration of different spare parts and the periodical demand of the spare parts, determines a purchase quantity of the spare parts according to the stock of the spare parts of the company, and determines the purchase timing of the spare parts in combination with the purchase duration.

Specifically, the purchase statistics module determines the purchase quantity of the spare parts and the purchase timing of the spare parts by using clustering statistics. Specifically includes: a replacement period of the spare parts and a replacement quantity in the corresponding period are determined according to the replacement time of the spare parts in the device maintenance archive; the operating service duration of different spare parts is determined through the replacement period of the spare parts; the warranty period of the spare parts is acquired from the spare part information archive; and in combination with the operating service duration requirement desired to be met by the spare parts in stock, the demand of spare parts in a certain period is determined by taking the brand of the spare parts as a clustering condition.

The purchase quantity of the spare parts is determined by taking the maximum stock of the spare parts in the company as an upper limit value, and the purchase timing of the spare parts is determined in combination with the shortest operating service duration of the spare parts and the time of purchase of the spare parts.

The present invention further provides a cigarette device management method, including the following steps:

Step 1: Establishing Archives establishing a spare part information archive, a spare part use archive, a device maintenance archive and a part/component replacement archive of an information management module, where contents entered into the spare part information archive includes: a spare part code, a spare part name, an applicable machine type, a manufacturer, recommended service duration of the spare part, time of purchase, and a warranty period;

contents entered into the spare part use archive include: the spare part code, a device using the spare part, and a usage quantity for the spare part;

contents entered into the device maintenance archive include: maintenance time, failure reason analysis, the name of the spare part for maintenance and the spare part code; and contents entered into the part/component replacement archive include: replacement time, a replacement reason, a replacement process, and the code of the spare part for the part/component;

Step 2: Determining Input Values determining recommended service duration of the spare part from the established archives, determining operating service duration of the spare part according to the spare part replacement time, and determining an operating duration of the device from a device state acquisition module;

Step 3: Building a Maintenance Prediction Model building a maintenance prediction module by an artificial neural network model, establishing a key parameter prediction model by taking the parameter obtained in the step 2 as an input factor and the failure interval as an output factor, and predicting the failure interval of the spare part through two neurons; and Step 4: Determining Maintenance Timing determining the maintenance timing according to the device operating parameter and the failure interval acquired by the device state acquisition module, where when the device operating parameter is within a safety parameter range, the device operating parameter is stable and the maintenance timing is determined based on the failure interval predicted by the maintenance prediction module; and the time when the device operating parameter is out of the safety parameter range is the maintenance timing; the device operating parameter includes device parameters obtained from the sensor installed on the device and production process parameters obtained from the sensor and the measuring and monitoring equipment; and Step 5: Calculating Purchase Timing of the Spare Parts performing calculation by using a clustering statistics-limiting value setting method, determining a replacement period of the spare parts and a replacement quantity in the corresponding period according to the replacement time of the spare parts in the device maintenance archive, determining the operating service duration of different spare parts by the replacement period of the spare parts, acquiring the warranty period of the spare parts from the spare part information archive, and determining the demand of the spare parts in a certain period by taking the brand of the spare parts as a clustering condition; and determining a purchase quantity of the spare parts by taking the maximum stock of the spare parts of the company as an upper limit value, and determining the purchase timing of the spare parts in combination with the shortest operating service duration of the spare parts and the purchase duration of the spare parts.

Advantages of the present invention are:

the information management module is established, which includes the spare information archive, the spare part use archive, the device maintenance archive and the part/component replacement archive to record related information parameters of the spare part, the use of the spare part, the maintenance of the device and the replacement of the part/component completely and uniformly. When it is necessary to query the replacement and maintenance records or the spare part parameter information, the later management query is convenient. Moreover, after the use conditions of different brands of the spare parts are recorded, the spare parts may be screened according to their use quality, and the spare parts with higher quality can be purchased later.

Through the neural network prediction model, the maintenance prediction module takes the operating service duration of the spare part, the recommended service duration and the operating duration of the device as the input values and then outputs the failure interval after passing through the intermediate neuron. The method can objectively predict the failure occurrence interval based on the specific numerical value and has high reliability. The module determines the maintenance timing with reference to a range of the device operating parameter of the device state acquisition module. Since the maintenance timing is confirmed instantly according to the current state of the device, the confirmation method has comprehensive considerations and is of great significance in maintaining the device effectively and timely.

In the purchase statistics module, the purchase quantity of spare parts and the purchase timing of the spare parts are determined based on data in the information management module and according to the stock of the spare parts and the purchase duration of the spare parts. The purchase statistics module is of an important guiding significance in timely purchase of the spare parts and reasonable purchase quantity.

BRIEF DESCRIPTION OF THE DRAWINGS

The present invention is further described below with reference to the accompanying drawings and the specific embodiments.

DETAILED DESCRIPTION OF THE EMBODIMENTS

The following clearly and completely describes the technical solutions in the embodiments of the present invention with reference to accompanying drawings in the embodiments of the present invention. Apparently, the described embodiments are merely a part rather than all of the embodiments of the present invention. Based on the embodiments of the present invention, all the other embodiments obtained by those of ordinary skill in the art without inventive effort are within the scope of the present invention.

One embodiment of the present disclosure provides a cigarette equipment management system, including an information management module, and a maintenance prediction module, a device state acquisition module and a purchase statistics module which are in communication connection with the information management module. The information management module includes a spare part information archive, a spare part use archive, a device maintenance archive and a part/component replacement archive. The maintenance prediction module is built by an artificial neural network model and is configured to predict a failure interval. The device state acquisition module is configured to acquire a device operating parameter and a device operating duration in real time, and compare the device operating parameter with a safety parameter range. The purchase statistics module is configured to determine the purchase quantity of the spare parts and the purchase timing of the spare parts by using clustering statistics. In accordance with the present invention, the maintenance timing of the device can be predicted through a duration parameter of the spare part and the operating parameters of the device, the purchase quantity of the spare part can be determined through previous records for device maintenance and spare part replacement, and the purchase timing of the spare part can be determined in combination with the purchase duration of the spare part.

Embodiment 1

Figure 1:
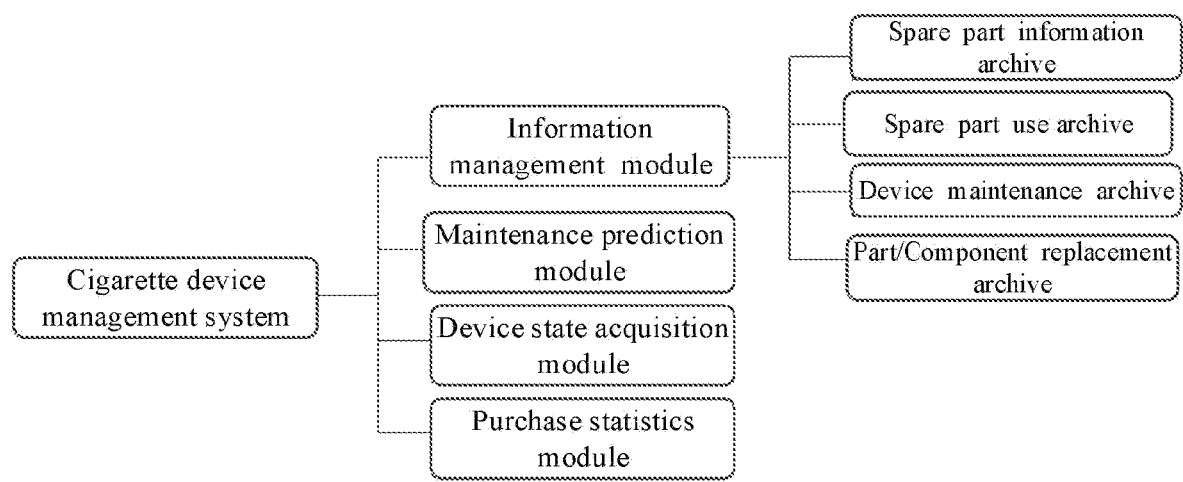
FIG. 1 is a module diagram of a system in accordance with the present invention.
Figure 2:
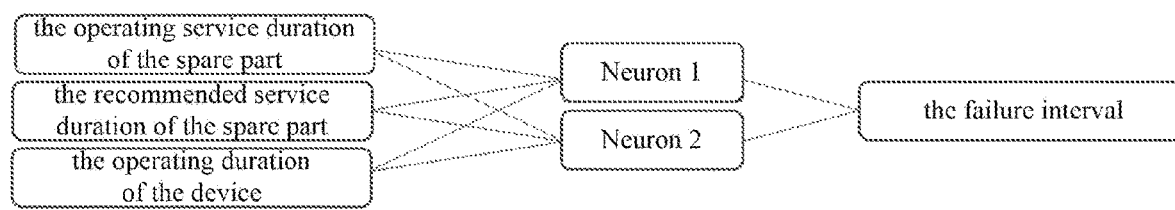
FIG. 2 is a schematic diagram of a maintenance prediction module in accordance with the present invention.

Referring to FIG. 1 to FIG. 2, a cigarette device management system includes an information management module, and a maintenance prediction module, a device state acquisition module and a purchase statistics module which are in communication connection with the information management module. The information management module includes a spare part information archive, a spare part use archive, a device maintenance archive and a part/component replacement archive, where the spare part information archive is filled in and recorded manually and includes the following contents: a spare part code, a spare part name, an applicable machine type, a manufacturer, recommended service duration of the spare part, time of purchase, and a warranty period;

the spare part use archive is filled in and recorded manually and includes the following contents: a spare part code, a device using the spare part, and a usage quantity for the spare part;

the device maintenance archive is filled in and recorded manually and includes the following contents: maintenance time, failure reason analysis, the name of the spare part for maintenance, and the spare part code; and the part/component replacement archive is filled in and recorded manually and includes the following contents: replacement time, a replacement reason, and the code of the spare part for the part/component.

It is convenient to count the actual service duration and manufactures of various brands of spare parts from the information management module, and the quality of the spare parts from different manufacturers can be counted for screening.

The maintenance prediction module is built by an artificial neural network model and is configured to predict a failure interval of a processing device. The maintenance prediction module has three input values, one output value and two neurons, where the three input values respectively are the operating service duration of the spare part, the recommended service duration of the device and the operating duration of the device, and the output value is the failure interval.

Specifically, the operating service duration of the spare part is the time duration between the current time and the replacement time of spare part.

The device state acquisition module acquires a device operating parameter and an operating duration of the device in real time and compares the device operating parameter with a safety range of the operating parameter; when the device operating parameter is within a safety parameter range, the device operates stably, and the maintenance timing is determined according to the failure interval predicted by the maintenance prediction module and the previous failure time point, that is the sum of the spare part replacement time and the failure interval; and the time when the operating parameter is out of the safety parameter range is the maintenance timing.

In a preferred embodiment, the device state acquisition module performs real-time acquisition by a data acquisition card and includes a communication interface, a sensor, and an information acquisition system. Specifically, the device state acquisition module connects a related I/O point or other interfaces of a production device to the corresponding sensor to acquire corresponding processing information, including various parameters of device operation. Optionally, the device state acquisition module may also acquire device information by an Ethernet mode or other ways.

The purchase statistics module counts according to the replacement time of the part/component replacement archive of the information management module to obtain the operating service duration of different spare parts and a periodical demand of the spare parts, determines a purchase quantity of the spare parts according to the stock of the spare parts of the company and determines the purchase timing of the spare parts according to the purchase duration.

Specifically, the purchase statistics module determines the purchase quantity of the spare parts and the purchase timing of the spare parts by using a clustering statistic method, specifically, a replacement period of the spare parts and a replacement quantity in the corresponding period are determined according to the replacement time of the spare parts in the device maintenance archive, the operating service duration of different spare parts is determined through the replacement period of the spare parts, the warranty period of the spare parts is acquired from the spare part information archive, and in combination with the operating service duration requirement desired to be met by the spare parts in stock, the demand of spare parts in a certain period is determined by taking the brand of the spare parts as a clustering condition; and the purchase quantity of the spare parts is determined by taking the maximum stock of the spare parts in the company as an upper limit value, and the purchase timing of the spare parts is determined in combination with the shortest operating service duration of the spare parts and the purchase duration of the spare parts.

Embodiment 2

Referring to FIG. 1 to FIG. 2, a cigarette device management system includes an information management module, and a maintenance prediction module, a device state acquisition module and a purchase statistics module which are in communication connection with the information management module.

Specifically, the information management module includes a spare part information archive, a spare part use archive, a device maintenance archive and a part/component replacement archive which are all entered by a computer for automatic statistics.

The spare part information archive may be coded on spare parts in advance to input spare part information, and when it is necessary to input the spare part information, the spare part information may be acquired by scanning the code. The spare part information archive includes the following contents: a spare part code, a spare part name, an applicable machine type, a manufacturer, recommended service duration of the spare part, time of purchase, a storage position, and a warranty period;

the spare part use archive includes: the spare part code, a device using the spare part, a spare part replacement process, and a usage quantity for the spare part;

the device maintenance archive includes: maintenance time, failure reason analysis, a maintenance process, the name of the spare part for maintenance, the spare part code and a person in charge of maintenance; and the part/component replacement archive includes: replacement time, a replacement reason, a replacement process, the code of the spare part for the part/component, and a person in charge of replacement.

It is convenient to count the actual service duration and manufactures of various brands of spare parts from the information management module, and the quality of the spare parts from different manufacturers can be counted and screened.

The maintenance prediction module is built by an artificial neural network model and is configured to predict a failure interval of a processing device. The maintenance prediction module has three input values, one output value and two neurons, where the three input values are respectively the operating service duration of the spare part, the recommended service duration of the device and the operating duration of the device, and the output value is the failure interval.

Specifically, the operating service duration of the spare part is the time duration between the current time and the spare part replacement time.

The device state acquisition module acquires a device operating parameter and an operating duration of the device in real time and compares the device operating parameter with a safety range of the operating parameter; when the device operating parameter is within a safety parameter range, the device operates stably, and the maintenance timing is determined according to the failure interval predicted by the maintenance prediction module and the previous failure time point, that is the sum of the spare part replacement time and the failure interval; and the time when the operating parameter is out of the safety parameter range is the maintenance timing.

As a preferred scheme of this embodiment, the device state acquisition module performs real-time acquisition by a data acquisition card and includes a communication interface, a sensor, and an information acquisition system. Specifically, the device state acquisition module connects a related I/O point or other interfaces of a production device to the corresponding sensor to acquire corresponding processing information, including various parameters of device operation. Optionally, the device state acquisition module may also acquire device information by an Ethernet mode or other ways.

The purchase statistics module counts according to the replacement time of the part/component replacement archive of the information management module to obtain the operating service duration of different spare parts and a periodical demand of the spare parts, determines a purchase quantity of the spare parts according to the stock of the spare parts of the company and determines the purchase timing of the spare parts according to the purchase duration.

Specifically, the purchase statistics module determines the purchase quantity of the spare parts and the purchase timing of the spare parts by using a clustering statistic method, specifically, a replacement period of the spare parts and a replacement quantity in the corresponding period are determined according to the replacement time of the spare parts in the device maintenance archive, the operating service duration of different spare parts is determined through the replacement period of the spare parts, the warranty period of the spare parts is acquired from the spare part information archive, and in combination with the operating service duration requirement desired to be met by the spare parts in stock, the demand of spare parts in a certain period is determined by taking the brand of the spare parts as a clustering condition; and the purchase quantity of the spare parts is determined by taking the maximum stock of the spare parts in the company as an upper limit value, and the purchase timing of the spare parts is determined in combination with the shortest operating service duration of the spare parts and the purchase duration of the spare parts.

Embodiment 3

Referring to FIG. 1 to FIG. 2, a cigarette device management method is applied to the cigarette device management system according to Embodiments 1 to 2, and includes the following steps:

Step 1: Establishing Archives establishing a spare part information archive, a spare part use archive, a device maintenance archive and a part/component replacement archive of an information management module, where contents entered into the spare part information archive includes: a spare part code, a spare part name, an applicable machine type, a manufacturer, recommended service duration of the spare part, time of purchase, and a warranty period;

contents entered into the spare part use archive include: the spare part code, a device using the spare part, and a usage quantity for the spare part;

contents entered into the device maintenance archive include: maintenance time, failure reason analysis, the name of the spare part for maintenance and the spare part code; and contents entered into the part/component replacement archive include: replacement time, a replacement reason, a replacement process, and the code of the spare part for the part/component;

Step 2: Determining Input Values determining recommended service duration of the spare part from the established archives, determining operating service duration of the spare part according to the spare part replacement time, and determining a device operating duration from a device state acquisition module;

Step 3: Building a Prediction Model building a maintenance prediction module by an artificial neural network model, establishing a key parameter prediction model by taking the parameters obtained in the step 2 as input factors and the failure interval as an output factor, and predicting the failure interval of the spare part through two neurons; and Step 4: Determining the Maintenance Timing determining the maintenance timing according to the device operating parameter and the failure interval acquired by the device state acquisition module, where when the device operating parameter is within a safety parameter range, the device operating parameter is stable and the maintenance timing is determined based on the failure interval predicted by the maintenance prediction module; and the time when the device operating parameter is out of the safety parameter range is the maintenance timing; and Step 5: Calculating the Purchase Timing of the Spare Parts performing calculation by using a clustering statistics-limiting value setting method, determining a replacement period of the spare parts and a replacement quantity in the corresponding period according to the replacement time of the spare parts in the device maintenance archive, determining the operating service duration of different spare parts through the replacement period of the spare parts, acquiring the warranty period of the spare parts from the spare part information archive, and determining the demand of the spare parts in a certain period by taking the brand of the spare parts as a clustering condition; and determining a purchase quantity of the spare parts by taking the maximum stock of the spare parts of the company as an upper limit value, and determining the purchase timing of the spare parts in combination with the shortest operating service duration of the spare parts and the purchase duration of the spare parts.

Finally, it should be noted that the above description is only a preferred embodiments of the present invention and is not intended to limit the present invention. Although the present invention has been described in detail with reference to the foregoing embodiments, those skilled in the art can still modify the technical solutions described in the foregoing embodiments, or substitute some of the technical features of the embodiments. Any modifications, equivalent substitutions, improvements, etc. within the spirit and principle of the present invention should fall within the protection scope of the present invention.

What is claimed is:

1. A cigarette device management method, wherein the method comprises the following steps:

step 1: establishing archives, comprising establishing the spare part information archive, the spare part use archive, the device maintenance archive and the part/component replacement archive of the information management module, wherein contents entered into the spare part information archive comprises a spare part code, a spare part name, an applicable machine type, a manufacturer, a recommended service duration of a spare part, a time of purchase, and a warranty period;

contents entered into the spare part use archive comprise the spare part code, a device using the spare part, and a usage quantity for the spare part;

contents entered into the device maintenance archive comprise a maintenance time, a failure reason analysis, a name of the spare part for a maintenance, and the spare part code; and contents entered into the part/component replacement archive comprise a replacement time, a replacement reason, a replacement process, and a code of a spare part for a part/component;

step 2: determining input values, comprising determining the recommended service duration of the spare part from the established archives, determining an operating service duration of the spare part according to the replacement time of the spare part, and determining the operating duration of the device from the device state acquisition assembly;

step 3: building a maintenance prediction model, comprising building the maintenance prediction neural-network module by an artificial neural network model, establishing a key parameter prediction model by taking the recommended service duration of the spare part, the operating service duration of the spare part, and the operating duration of the device obtained in step 2 as input factors and the failure interval as an output factor, and predicting the failure interval of the spare part through two neurons;

step 4: determining the maintenance timing, comprising determining the maintenance timing according to the device operating parameter and the failure interval acquired by the device state acquisition assembly, wherein when the device operating parameter is within the safety parameter range, the device operating parameter is stable and the maintenance timing is determined based on the failure interval predicted by the maintenance prediction neural-network module; and the time when the device operating parameter is out of the safety parameter range is the maintenance timing; and step 5: calculating a purchase timing of the spare parts, comprising performing a calculation by using a clustering statistics-limiting value setting method, determining a replacement period of the spare parts and a replacement quantity corresponding to the replacement period according to the replacement time of the spare parts in the device maintenance archive, determining an operating service duration of different spare parts through the replacement period of the spare parts, acquiring the warranty period of the spare parts from the spare part information archive, and determining a demand of the spare parts in a predetermined period by taking a brand of the spare parts as a clustering condition; and determining a purchase quantity of the spare parts by taking a maximum stock of the spare parts as an upper limit value, and determining the purchase timing of the spare parts in combination with a shortest operating service duration of the spare parts and a purchase duration of the spare parts, wherein the demand is the determined replacement quantity corresponding to the replacement period.

\* \* \* \* \*